US010535849B2

(12) United States Patent
Kwon et al.

(10) Patent No.: US 10,535,849 B2
(45) Date of Patent: Jan. 14, 2020

(54) METHOD FOR MANUFACTURING BATTERY MODULE AND BATTERY MODULE

(71) Applicant: LG CHEM, LTD., Seoul (KR)

(72) Inventors: Pan-Jung Kwon, Daejeon (KR); Geon-Tae Park, Daejeon (KR); Ju-Hwan Baek, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/260,336

(22) Filed: Jan. 29, 2019

(65) Prior Publication Data
US 2019/0267584 A1 Aug. 29, 2019

(30) Foreign Application Priority Data
Feb. 2, 2018 (KR) .......................... 10-2018-0013491

(51) Int. Cl.
*H01M 2/10* (2006.01)
(52) U.S. Cl.
CPC ......... *H01M 2/105* (2013.01); *H01M 2/1077* (2013.01)
(58) Field of Classification Search
CPC ......... H01M 2220/20; H01M 2220/30; H01M 2/206; H01M 2/1077; H01M 2/105
See application file for complete search history.

(56) References Cited

U.S. PATENT DOCUMENTS

| 2012/0082887 A1* | 4/2012 | Ninomiya | H01G 9/08 |
| | | | 429/159 |
| 2016/0197315 A1* | 7/2016 | Tatsumi | H01M 2/024 |
| | | | 429/185 |
| 2016/0276637 A1* | 9/2016 | Kusaba | H01M 2/1072 |
| 2016/0380242 A1 | 12/2016 | Jang | |

FOREIGN PATENT DOCUMENTS

| JP | 2004-087774 A | | 3/2004 | |
| JP | 2009-037975 A | | 2/2009 | |
| JP | 2011178996 A | * | 9/2011 | .......... H01M 2/1077 |
| JP | 2015191699 A | * | 11/2015 | .............. H01M 2/08 |
| JP | 2016085914 A | * | 5/2016 | ............ H01M 2/105 |

(Continued)

*Primary Examiner* — Stewart A Fraser
(74) *Attorney, Agent, or Firm* — Morgan, Lewis & Bockius LLP

(57) ABSTRACT

A method for manufacturing a battery module includes preparing a plurality of cylindrical battery cells having electrode terminals respectively at upper and lower portions, and a module housing having an accommodation portion with a plurality of hollow structures to accommodate the cylindrical battery cells therein; adding an adhesive having thermally and ultraviolet curing properties to an inner surface of the accommodation portion; partially curing the adhesive by applying heat thereto to increase a viscosity of the adhesive; accommodating the cylindrical battery cells in the accommodation portion so that the partially-cured adhesive is between the accommodation portion of the module housing and the cylindrical battery cells; after the accommodating of the cylindrical battery cells in the accommodation portion, applying heat to the adhesive to lower the (Continued)

viscosity of the adhesive; and, after the viscosity is lowered by applying the heat, curing the adhesive by irradiating ultraviolet rays to the adhesive.

14 Claims, 7 Drawing Sheets

(56) References Cited

FOREIGN PATENT DOCUMENTS

| | | | | |
|---|---|---|---|---|
| JP | 2016173903 A | * | 9/2016 | .......... H01M 2/1072 |
| JP | 2017-151143 A | | 8/2017 | |
| KR | 10-1600686 B1 | | 3/2016 | |
| KR | 10-2016-0050838 A | | 5/2016 | |
| KR | 10-2017-0001443 A | | 1/2017 | |
| WO | 2002/078114 A1 | | 10/2002 | |

* cited by examiner

METHOD FOR MANUFACTURING BATTERY MODULE AND BATTERY MODULE

TECHNICAL FIELD

The present application claims priority to Korean Patent Application No. 10-2018-0013491 filed on Feb. 2, 2018 in the Republic of Korea, the disclosures of which are incorporated herein by reference.

The present disclosure relates to a method for manufacturing a battery module and a battery module, and more particularly, to a method for manufacturing a battery module with improved efficiency and a battery module manufactured by the method to have improved durability.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance secondary batteries allowing repeated charging and discharging are being actively studied.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. The lithium secondary battery includes an electrode assembly in which a positive electrode plate coated with the positive electrode active material and a negative electrode plate coated with the negative electrode active material are disposed with a separator being interposed therebetween, and an exterior, namely a battery case, for sealably containing the electrode assembly together with an electrolyte.

Generally, the lithium secondary battery may be classified into a can-type secondary battery in which the electrode assembly is included in a metal can and a pouch-type secondary battery in which the electrode assembly is included in a pouch made of aluminum laminate sheets, depending on the shape of the exterior.

In the can-type secondary battery, a metal can in which an electrode assembly is included may be fabricated in a cylindrical form. The can-type secondary battery may be used to construct a battery module with a housing that accommodates a plurality of secondary batteries.

However, if the plurality of secondary batteries are accommodated in the inner space of the housing of the battery module without a securing means, in an environment where shocks caused by shaking or rattling are frequently applied to a running vehicle to which the battery module is mounted, the secondary battery is frequently moved inside the accommodation space of the housing, which may cause damage to the secondary battery or disconnection between the electrode terminal and the bus bar.

Thus, in recent years, various methods have been attempted to fix the plurality of secondary batteries accommodated in the housing without movement inside the accommodation space. For example, an attempt is made to apply a method of securing the secondary batteries inside the housing with an adhesive.

However, the adhesive applied to the housing is easy to flow down from the inner surface of the accommodation space of the housing. Thus, the adhesive may be lost out of the housing, and it is difficult to maintain the uniform distribution and constant thickness of the adhesive on the inner surface of the housing.

Moreover, the adhesive lost out of the housing may contaminate other components of the battery module to cause product defects or contaminate the work environment to disturb operations of workers. Further, since the adhesive is not uniformly distributed and cured on the inner surface of the accommodation space of the housing, the secondary battery fixed in the accommodation space of the housing may be easily released, which makes it difficult to prevent the secondary battery from being damaged or the connection between the electrode terminal and the bus bar from being cut.

Thus, it is necessary to develop a technology for an improved method for manufacturing a battery module to solve the above problem.

DISCLOSURE

Technical Problem

The present disclosure is designed to solve the problems of the related art, and therefore the present disclosure is directed to providing a method for manufacturing a battery module with improved efficiency and a battery module manufactured by the method to have improved durability.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a method for manufacturing a battery module, comprising:

(a) preparing a plurality of cylindrical battery cells having electrode terminals respectively formed at an upper portion and a lower portion thereof, and a module housing in which an accommodation portion having a plurality of hollow structures is formed to accommodate the plurality of cylindrical battery cells therein;

(b) adding an adhesive having a thermally curing property and an ultraviolet curing property to an inner surface of the accommodation portion of the module housing;

(c) partially curing the added adhesive by applying heat thereto to increase viscosity of the adhesive;

(d) accommodating the plurality of cylindrical battery cells in the accommodation portion so that the partially-cured adhesive is interposed between the accommodation portion of the module housing and the cylindrical battery cells;

(e) after the step (d) of accommodating the cylindrical battery cells in the accommodation portion, applying heat to the adhesive to lower viscosity of the adhesive; and (f) finally curing the adhesive by irradiating ultraviolet rays to the adhesive whose viscosity is lowered in the step (e).

Also, in the step (c), the adhesive may be heated for 20 seconds to 40 seconds in a temperature condition of 140° C. to 170° C. Specifically, in the step (c), if the adhesive is heated below 140° C. or for less than 20 seconds, the adhesive does not easily come into a semi-curing state, and thus the viscosity may not be properly increased and too much time may be taken to come into a semi-curing state. Conversely, if the adhesive is heated above 170° C. or for more than 40 seconds in the step (c), the adhesive is cured so fast not to be controlled to come into a semi-curing state.

Further, in the step (e), the adhesive may be heated for 1 second to 60 seconds at 180° C. to 220° C. Specifically, in the step (e), if the adhesive is heated below 180° C., the adhesive is not melted enough to lower the viscosity as in a liquid state, so it is difficult for the adhesive to adhere and fix the accommodation portion and the cylindrical battery cells. Conversely, if the adhesive is heated above 220° C. in the step (e), the adhesive is cured, so that the viscosity may be increased rather than being lowered. In addition, if the adhesive is heated at 180° C. to 220° C. for more than 60 seconds in the step (e), the adhesive is cured, so that the viscosity may be increased rather than being lowered.

In addition, in the step (f), the adhesive may be finally cured by performing thermal curing and ultraviolet curing together.

Also, in the step (f), the adhesive may be heated for 30 minutes to 3 hours at temperature of 180° C. to 220° C. Specifically, in the step (f), if the adhesive is heated at a seriously low temperature lower than 180° C., the time required for thermal curing may become too long, which is undesirable because of the long manufacturing time. Also, if the adhesive is heated only for a too short time less than 30 minutes in the step (f), it is difficult to have enough time to reach final curing. Conversely, if the adhesive is heated at temperatures above 220° C. for a long time in the step (f), the adhesive may be deformed, and the cylindrical battery cells may be heated to adversely affect battery performance, undesirably.

Moreover, in the step (f), at least a portion of the adhesive may be exposed to ultraviolet rays for 10 seconds to 30 seconds. Specifically, in the step (f), if the adhesive is exposed the ultraviolet rays for a too short time less than 10 seconds, the adhesive is not properly photo-cured, so that the fixing force for fixing the cylindrical battery cells to the accommodation portion may be deteriorated. Conversely, if the adhesive is exposed to ultraviolet rays over 30 seconds in the step (f), the manufacturing time increases, which may raise the manufacturing costs.

Further, in the step (a), the module housing may be prepared so that a fine uneven structure having a convex portion protruding toward the cylindrical battery cells or a concave portion recessed opposite to the cylindrical battery cells is formed at the inner surface of the accommodation portion of the module housing.

In addition, in the step (b), the adhesive may be applied to coat the convex portion of the fine uneven structure.

Also, in the step (b), the adhesive may be applied so that the adhesive is partially accommodated in the concave portion of the fine uneven structure.

Further, in another aspect of the present disclosure, there is also provided a battery module, comprising:

a plurality of cylindrical battery cells having electrode terminals respectively formed at an upper portion and a lower portion thereof; and a module housing having an accommodation portion with a plurality of hollow structures so that the plurality of cylindrical battery cells are inserted and accommodated therein, wherein an adhesive having a thermally curing property and an ultraviolet curing property is added to an inner surface of the accommodation portion so that the cylindrical battery cells are adhered and fixed thereto.

In addition, a fine uneven structure having a convex portion protruding toward the cylindrical battery cells or a concave portion recessed opposite to the cylindrical battery cells may be formed at the inner surface of the accommodation portion of the module housing.

Moreover, an adsorption pad configured to adsorb at least a portion of the adhesive may be provided at the accommodation portion of the module housing.

Further, the adhesive may be applied to coat the convex portion of the fine uneven structure.

Also, the adhesive may be applied so that the adhesive is partially accommodated in the concave portion of the fine uneven structure.

In addition, in another aspect of the present disclosure, there is also provided a battery pack, comprising at least one battery module of the present disclosure.

Further, in another aspect of the present disclosure, there is also provided a device, comprising the battery pack of the present disclosure.

Advantageous Effects

According to an embodiment of the present disclosure, in the manufacturing method of the present disclosure, since the adhesive applied to the inner surface of the accommodation portion of the module housing is partially cured, it is possible to prevent the adhesive from flowing down on the inner surface of the accommodation portion. Thus, the adhesive may be kept to be uniformly applied to a certain thickness, and it is possible prevent that the adhesive is lost out of the housing to contaminate the working environment.

Also, according to this embodiment of the present disclosure, in the manufacturing method of the present disclosure, since the adhesive added to the accommodation portion is partially cured to reduce the surface adhesion, it is not disturbed that the cylindrical battery cell is inserted, which may effectively increase the process speed for inserting the plurality of cylindrical battery cells, thereby enhancing the manufacturing efficiency and reducing the manufacturing cost.

Moreover, according to an embodiment of the present disclosure, after the step (d), in a state where the plurality of cylindrical battery cells are not fixed to the accommodation portion of the module housing, the first electrode terminal and the second electrode terminal of the plurality of cylindrical battery cells are connected to the first current collection plate and the second current collection plate, respectively. Thus, welding work may be performed so that the bonding surfaces between the plurality of cylindrical battery cells and the current collection plates are in close contact with each other, thereby improving the reliability in welding of the plurality of cylindrical battery cells.

In addition, according to an embodiment of the present disclosure, in the manufacturing method of the present disclosure, since the adhesive is finally cured by irradiating ultraviolet rays, or by heating and irradiating ultraviolet rays, the plurality of cylindrical battery cells accommodated in the module housing may be fixed without movement. Also, even though the battery module is exposed to frequent shaking and impacts, the cylindrical the battery cells may be stably fixed inside the module housing.

Accordingly, in the present disclosure, when movement or impact occurs at the manufactured battery module, it is possible to prevent the cylindrical battery cell from being damaged and the electric connection between the cylindrical battery cell and the bus bar from being cut, thereby effectively improving the durability of the battery module.

Also, according to another embodiment of the present disclosure, due to the fine uneven structure having a plurality of convex portions, it is possible to prevent the adhesive applied to the inner surface of the module housing from flowing down easily, and it is possible to prevent the adhesive from being partially lost or the applied adhesive from having uneven coating thickness.

Further, according to another embodiment of the present disclosure, due to the fine uneven structure having a plurality of concave portions, it is possible to prevent the adhesive applied to the inner surface of the module housing from flowing down easily, and it is possible to prevent the adhesive from being partially lost or the applied adhesive from having uneven coating thickness.

In addition, according to another embodiment of the present disclosure, since the module housing having an adsorption pad may absorb the adhesive so that the adhesive is not lost even in a flowable liquid state, it is possible to effective reduce flowing-down or losing of the adhesive.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
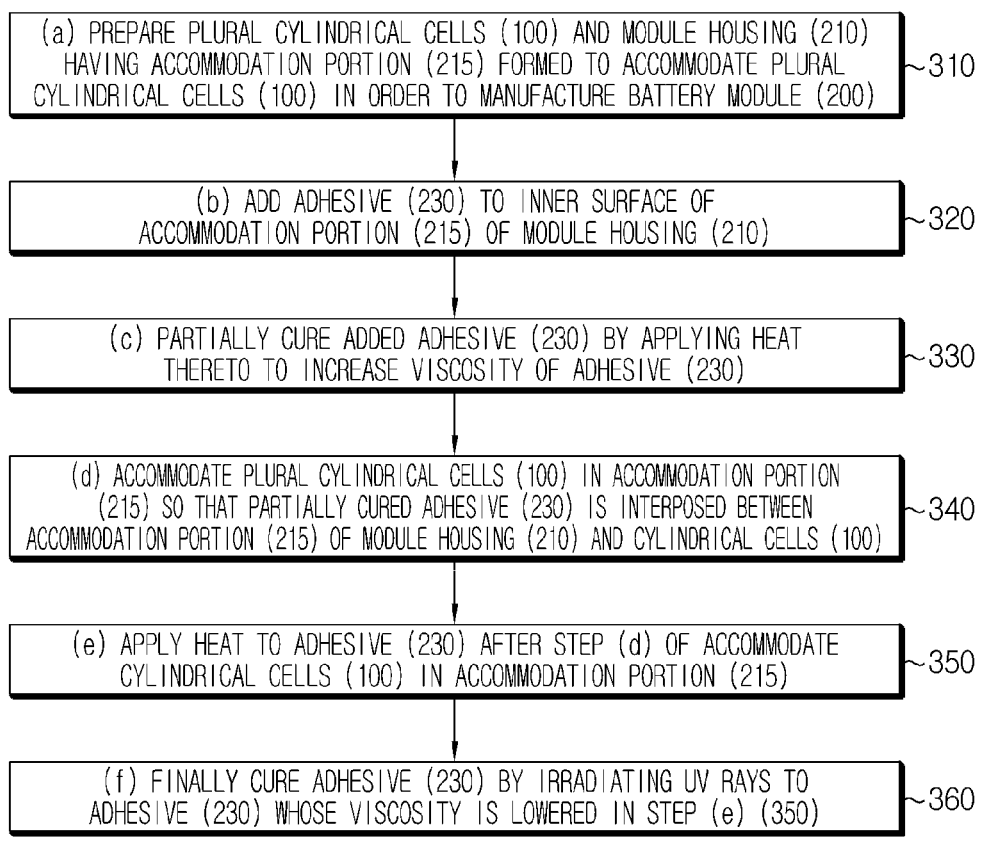
FIG. 1 is a flowchart for illustrating a method for manufacturing a battery module according to an embodiment of the present disclosure.
Figure 2:
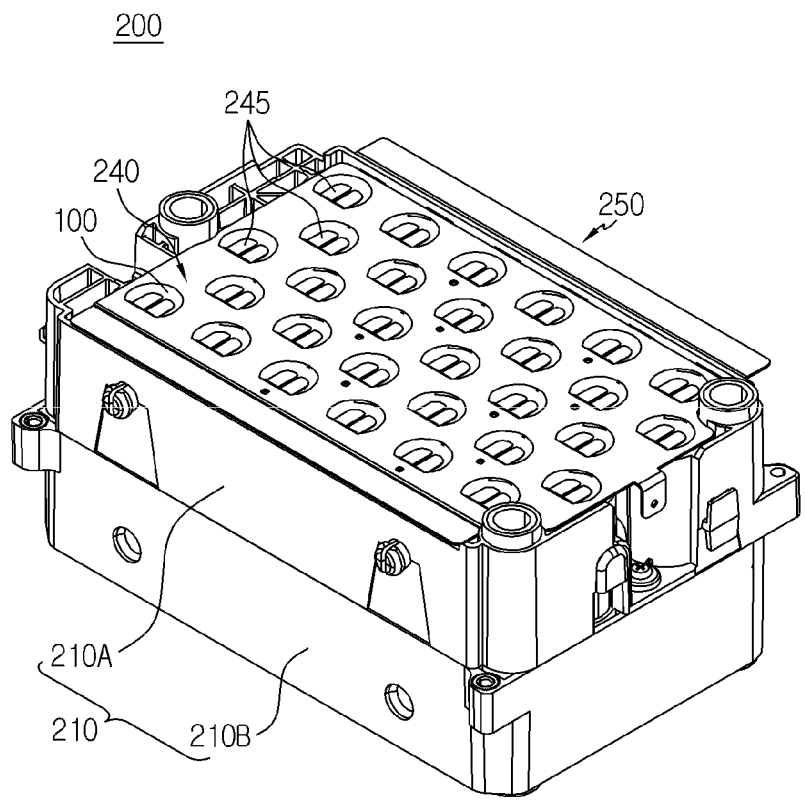
FIG. 2 is a perspective view schematically showing a battery module according to an embodiment of the present disclosure.

FIG. 1 is a flowchart for illustrating a method for manufacturing a battery module according to an embodiment of the present disclosure. FIG. 2 is a perspective view schematically showing a battery module according to an embodiment of the present disclosure. Also, FIG. 3 is an exploded perspective view schematically showing some components of the battery module according to an embodiment of the present disclosure.

Figure 3:
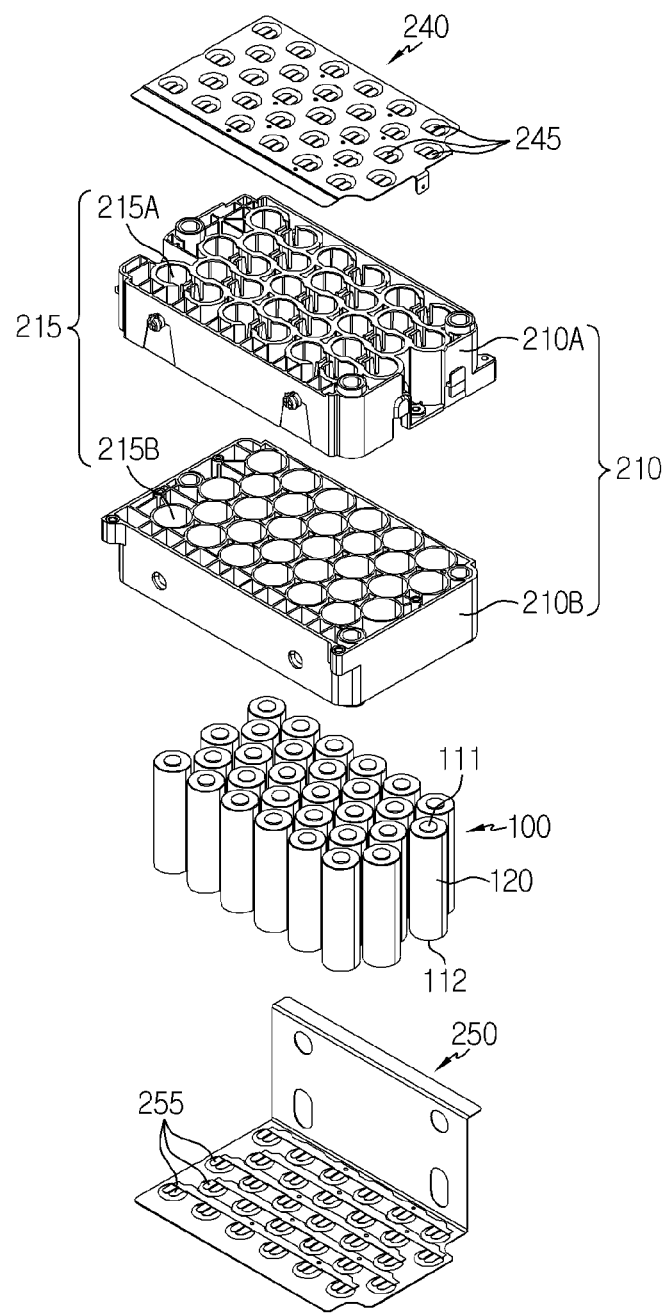
FIG. 3 is an exploded perspective view schematically showing some components of the battery module according to an embodiment of the present disclosure.

Referring to FIGS. 1 to 3, a method for manufacturing a battery module 200 according to the present disclosure may include a step (a) 310, a step (b) 320, a step (c) 330, a step (d) 340, a step (e) 350, and a step (f) 360.

First, in the step (a) 310, in order to manufacture the battery module 200, a plurality of cylindrical battery cells 100 and a module housing 210 having an accommodation portion 215 to accommodate the plurality of cylindrical battery cells 100 therein may be prepared.

Here, the cylindrical battery cell 100 may include a cylindrical battery can 120 and an electrode assembly (not shown) accommodated in the battery can 120.

Here, the battery can 120 includes a material having high electrical conductivity. For example, the battery can may include nickel, aluminum, copper, or the like. Electrode terminals 111, 112 may be formed at an upper portion and a lower portion of the battery can 120, respectively. Specifically, a first electrode terminal 111 may be formed at a circular flat top surface of the battery can 120, and a second electrode terminal 112 may be formed at a circular flat bottom surface of the battery can 120.

Also, the electrode assembly (not shown) may have in a rolled structure in a jelly-roll form in which a separator is interposed between a positive electrode and a negative electrode. A positive electrode tab may be attached to the positive electrode (not shown) and connected to a first electrode terminal 111 at the top of the battery can 120. A negative electrode tab may be attached to the negative electrode (not shown) and connected to a second electrode terminal 112 at the bottom of the battery can 120.

In addition, the cylindrical battery cell 100 may include a safety element (for example, a positive temperature coefficient (PTC) element, a TCO, or the like) that intercepts the current by greatly increasing the resistance when the temperature inside the battery cell rises. Also, the cylindrical battery cell 100 may have a safety vent structure that protrudes downward in a normal state but is ruptured while protruding to discharges gas when the pressure inside the cell rises.

However, the battery module 200 according to the present disclosure may adopt various kinds of cylindrical battery cells 100 known at the time of filing of this application, without being limited to the cylindrical battery cell 100 described above.

Figure 4:
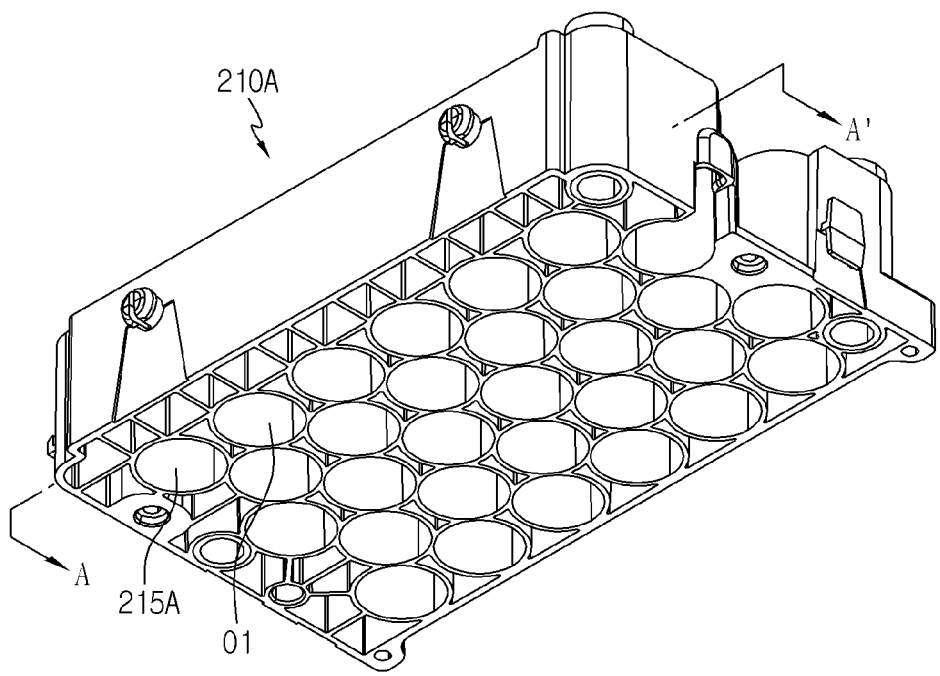
FIG. 4 is a perspective view schematically showing a bottom of an upper case, employed at the battery module according to an embodiment of the present disclosure.

FIG. 4 is a perspective view schematically showing a bottom of an upper case, employed at the battery module 200 according to an embodiment of the present disclosure.

Referring to FIG. 4 along with FIG. 3, the module housing 210 may include an upper case 210A and a lower case 210B configured to accommodate the plurality of cylindrical battery cells 100 therein.

Specifically, a plurality of accommodation portions 215A having a hollow structure may be formed in the upper case 210A to surround the outer side surface of the upper portion of the cylindrical battery cell 100 based on a vertical center.

Also, the cylindrical battery cell 100 may be inserted into a circular opening O1 of the accommodation portion 215A and accommodated in the upper case 210A. In addition, the accommodation portion 215A may be formed to closely surround the outer side surface of the cylindrical battery cell 100 in a horizontal direction. That is, the accommodation portion 215A may have an accommodation space formed to be closely adhered to the outer side surface of the cylindrical battery cell 100 so that a specific material, flame, or the like is not introduced therein.

Moreover, the upper case 210A may include an electrically insulating material. For example, the electrically insulating material may be a plastic material. In addition, the upper case 210A may be formed by injection molding.

Figure 5:
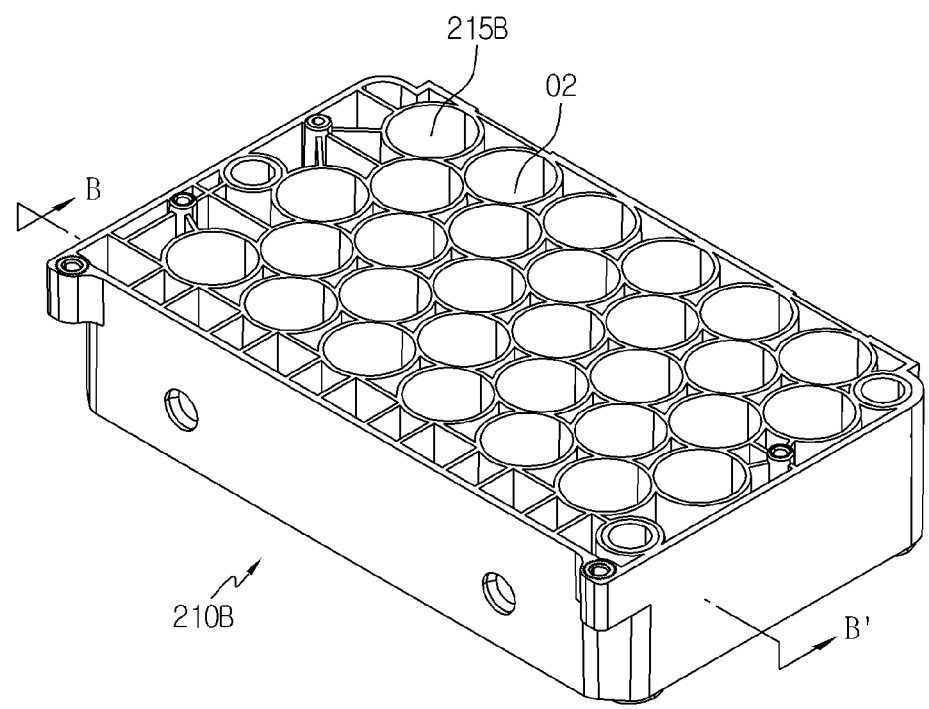
FIG. 5 is a perspective view schematically showing a lower case, employed at the battery module according to an embodiment of the present disclosure.

FIG. 5 is a perspective view schematically showing a lower case, employed at the battery module according to an embodiment of the present disclosure.

Referring to FIG. 5 along with FIG. 3, the lower case 210B may have a plurality of accommodating portions 215B of a hollow structure formed, which are formed to surround the outer side surface of the lower portion of the cylindrical battery cell 100 based on a vertical center.

Moreover, the cylindrical battery cell 100 may be inserted into a circular opening O2 of the accommodation portion 215B and accommodated in the lower case 210B. In addition, the accommodation portion 215B may be formed closely to surround the outer side surface of the cylindrical battery cell 100 in a horizontal direction. That is, the accommodation portion 215B may have an accommodation space formed to be closely adhered to the outer side surface of the cylindrical battery cell 100 so that a specific material, flame, or the like is not introduced therein.

Further, the lower case 210B may include an electrically insulating material. For example, the electrically insulating material may be a plastic material. In addition, the lower case 210B may be formed by injection molding.

Figure 6:
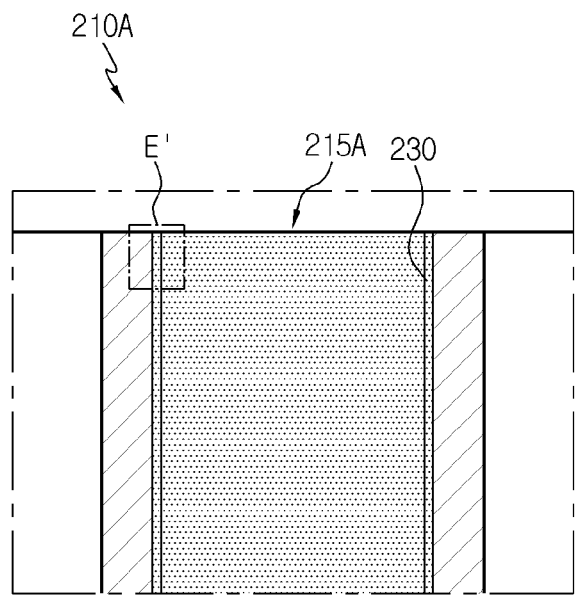
FIG. 6 is a partial cross-sectioned view schematically showing a portion of the upper case, employed at the battery module according to an embodiment of the present disclosure, taken along the line A-A' of FIG. 4.
Figure 7:
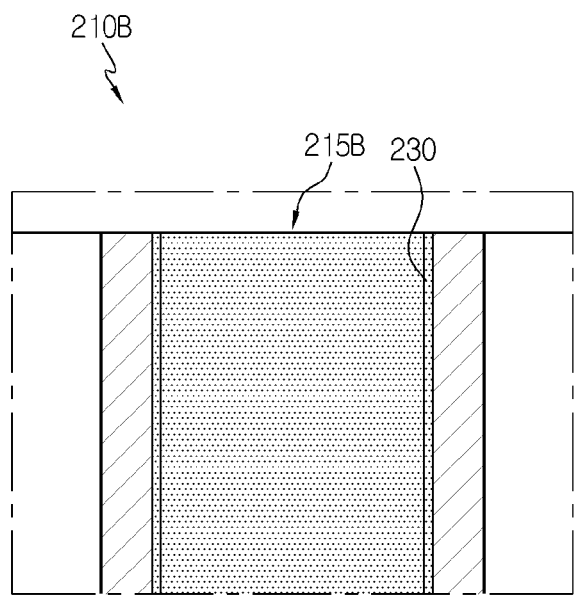
FIG. 7 is a partial cross-sectioned view schematically showing a portion of the upper case, employed at the battery module according to an embodiment of the present disclosure, taken along the line B-B' of FIG. 5.

FIG. 6 is a partial cross-sectioned view schematically showing a portion of the upper case, employed at the battery module according to an embodiment of the present disclosure, taken along the line A-A' of FIG. 4. Also, FIG. 7 is a partial cross-sectioned view schematically showing a portion of the upper case, employed at the battery module according to an embodiment of the present disclosure, taken along the line B-B' of FIG. 5.

Referring to FIGS. 4 to 7 along with FIG. 3, in the step (b) 320, an adhesive 230 may be added to an inner surface of the accommodation portion 215 of the module housing 210.

For example, as shown in FIG. 6, the adhesive 230 may be added to the entire inner surface of the accommodation portion 215A of the upper case 210A. Also, for example, as shown in FIG. 7, the adhesive 230 may be added to the entire inner surface of the accommodation portion 215B of the lower case 210B.

Specifically, the adhesive 230 may include at least one of a liquid unsaturated monomer, a photo-curing oligomer, and a photo-curing polymer. In addition, the photo-curing oligomer and the photo-curing polymer may be functionalized oligomer and polymer with an acryl oxy group or a vinyl group that are UV photo-reactive.

Also, the adhesive 230 may have a thermally curing property. In addition, the adhesive 230 may further include a thermal initiator. For example, the thermal initiator may be included by 0.1 weight % to 5 weight %, based on the total weight of the adhesive 230.

Here, the "thermal initiator" may be used to initiate the polymerization of the adhesive 230 and cure the adhesive 230. Also, the thermal initiator may be a thermal initiator well known in the art and capable of releasing radicals under certain temperature conditions. For example, the thermal initiator may employ initiators such as peroxide-based, azo-based or redox-based initiators.

Further, the adhesive 230 may have an ultraviolet (UV) curing property. Also, the adhesive 230 may further comprise a UV photo initiator. Here, the UV photo initiator may generally be reacted by irradiating light in a wavelength range of 200 nm to 400 nm. For example, the UV photo initiator may be a benzimidazole-based, acylphosphine oxide-based or a-amino ketone-based photo initiator. In addition, the UV photo initiator may be included by 0.1 weight % to 5 weight %, based on the total weight of the adhesive 230.

The term "curing" used herein refers to a change of a structure or a state in the material of the adhesive 230 due to at least one variable such as time, temperature change, moisture, light, curing catalyst or accelerator. The "curing" includes partial curing and overall curing. Also, the "curing" may mean 'partially crosslinked' or 'completely crosslinked'.

In addition, the viscosity of the adhesive 230 may be measured using a Brookfield viscosity meter. Specifically, the adhesive 230 before being cured may have viscosity of several thousand cps to several ten thousand cps, for example 10000 cps to 100000 cps, at a temperature of 25° C. with a shear rate of 2.55 $s^{-1}$, when measured by a rotational rheometer with a cone plate.

Unless otherwise defined, all technical and scientific terms used herein have the same meaning as commonly understood by those skilled in the art.

Further, the adhesive 230 may be coated onto the inner surface of the accommodation portion 215 of the module housing 210 to a thickness of 100 μm to 3 mm.

Referring to FIG. 3 along with FIG. 1, in the step (c) 330, heat may be applied to the added adhesive 230 to perform partial curing so that the viscosity of the adhesive 230 is increased.

Here, the "partial curing" may be referred to as "half curing", "incomplete curing" or "B-stage" and means an intermediate cured state. Also, the partially-cured added adhesive 230 may be in an intermediate state of the curing reaction process of the resin composition. Moreover, when partially cured, the adhesive 230 does not flow down like a solid rather than a liquid, and the surface adhesion may be reduced. Also, the viscosity of the partially-cured added adhesive 230 may be reduced again when heat is applied thereto, thereby becoming close to a liquid state.

Further, in the step (c) 330, in order to partially cure the adhesive 230, after the module housing 210 coated with the adhesive 230 is put into an air circulating oven, the adhesive 230 may be heated for 20 seconds to 40 seconds in a temperature condition of 140° C. to 170° C.

Also, the thermal curing may be performed using a common means. For example, an air circulating oven may be used for thermal curing of the adhesive 230. At this time, the time and temperature for the thermal curing depend on the specific adhesive composition.

Accordingly, since the adhesive 230 has a thermally curing property, the curing is promoted at 140° C. to 170° C., thereby increasing the viscosity. Further, the adhesive 230 may be partially cured to lower the surface adhesion.

Thus, according to this configuration of the present disclosure, in the manufacturing method of the present disclosure, since the adhesive 230 is partially cured in a state of being added to the inner surface of the accommodation portion 215 of the module housing 210, it is possible to prevent the adhesive 230 from flowing down on the inner surface of the accommodation portion 215. Thus, the adhesive 230 may be kept to be uniformly applied to a predetermined thickness, and it is possible to prevent that the adhesive 230 is lost out of the module housing 210 to pollute the working environment.

Further, when the adhesive 230 is partially cured, since the adhesive force of the surface is lowered, the work such as moving the module housing 210 or mounting components may be performed easier, the manufacturing process time is shortened, and the defective rate caused by contamination may be drastically reduced. At this time, the adhesive force of the adhesive 230 may be 0.5 MPa to 1.5 MPa. Alternatively, the adhesive 230 may have an adhesive force of 5 $kgf/cm^2$ to 15 $kgf/cm^2$.

Referring to FIGS. 1 and 3 again, in the step (d) 340 the plurality of cylindrical battery cells 100 may be accommodated in the accommodation portion 215 so that the partially-cured added adhesive 230 is interposed between the accommodation portion 215 of the module housing 210 and the cylindrical battery cells 100.

Specifically, first, the lower portion of the plurality of cylindrical battery cells 100 may be inserted into the accommodation portion 215B of the lower case 210B. Also, the upper case 210A may be mounted to the upper portion of the plurality of cylindrical battery cells 100 in a downward direction from the above so that the upper portion of the plurality of cylindrical battery cells 100 mounted on the lower case 210B is inserted into the accommodation portion 215A of the upper case 210A.

Thus, according to this configuration of the present disclosure, the partially-cured added adhesive 230 has a reduced surface adhesive force and thus does not interfere with the insertion of the cylindrical battery cells 100, thereby effectively increasing the process speed for inserting the plurality of cylindrical battery cells 100.

Moreover, in the present disclosure, while the cylindrical battery cells 100 are being inserted into the accommodation portion 215 of the module housing 210, it is possible to prevent that the cylindrical battery cells 100 interferes with the adhesive 230 to lose a part of the adhesive 230 or the added adhesive 230 has an irregular coating thickness.

Further, in the manufacturing method of the present disclosure, after the step (d) 340, the work for electrically connecting a first current collection plate 240 and a second current collection plate 250 to the first electrode terminal 111 and the second electrode terminal 112 of the plurality of cylindrical battery cells 100, respectively, may be further performed so that the plurality of cylindrical battery cells 100 accommodated in the module housing 210 are electrically connected to each other.

In particular, the battery module 200 of the present disclosure may include a first current collection plate 240 and a second current collection plate 250.

Here, the first current collection plate 240 may include an electrically conductive material, and, for example, the electrically conductive material may be copper or aluminum. In addition, the first current collection plate 240 may be configured to electrically connect a first connection portion 245, which is a partially protruded portion thereof, to the first electrode terminal 111 of the cylindrical battery cell 100.

In other words, the first current collection plate 240 may be mounted to the upper portion of the module housing 210 to electrically connect the first electrode terminals 111 of the plurality of cylindrical battery cells 100. At this time, the first connection portion 245 of the first current collection plate 240 and the first electrode terminal 111 may be bonded by laser welding or resistance welding.

In addition, the second current collection plate 250 may include an electrically conductive material, and, for example, the electrically conductive material may be copper or aluminum. Also, the second current collection plate 250 may be configured to electrically connect a second connection portion 255, which is formed by partially protruding the second current collection plate 250, to the second electrode terminal 112 of the cylindrical battery cell 100.

In other words, the second current collection plate 250 may be mounted to the upper portion of the module housing 210 to electrically connect the second electrode terminals 112 of the plurality of cylindrical battery cells 100. At this time, the second connection portion 255 of the second current collection plate 250 and the second electrode terminal 112 may be bonded by laser welding or resistance welding.

Thus, according to this configuration of the present disclosure, in the step (d) 340, since the plurality of cylindrical battery cells 100 are not yet fixed to the accommodation portion 215 of the module housing 210, the process of bonding the first electrode terminal 111 and the second electrode terminal 112 of the plurality of cylindrical battery cells 100 to the first current collection plate 240 and the second current collection plate 250, respectively, to be electrically connected may be easily performed.

That is, in order to allow the first electrode terminal 111 and the second electrode terminal 112 of the plurality of cylindrical battery cells 100 to come into contact with the first connection portion 245 of the first current collection plate 240 and the second connection portion 255 of the second current collection plate 250, it would be better that the plurality of cylindrical battery cells 100 are capable of freely moving to some extent, rather than being in a fixed state.

Also, in the step (e) 350, heat may be applied to the adhesive 230 after the step (d) 340 where the cylindrical battery cells 100 are accommodated in the accommodation portion 215. Specifically, the partially-cured added adhesive 230 may have a lowered viscosity again depending on the heating conditions. Thus, in the step (e) 350, the partially-cured added adhesive 230 may be heated to melt. At this time, the molten adhesive 230 may be configured to connect the outer surface of the cylindrical battery cells 100 to the inner surface of the accommodation portion of the module housing 210. For example, the adhesive 230 may be heated at 180° C. to 220° C. for 1 second to 60 seconds.

At this time, the module housing 210 may be accommodated in a closed chamber to heat the adhesive 230. Here, the inside of the chamber may create an air atmosphere of 180° C. to 220° C.

At this time, in the step (e) 350, the viscosity of the applied adhesive 230 of the module housing 210 may be lowered. Since the adhesive 230 is partially cured in the step (c) 330, if the adhesive 230 is heated again, the viscosity may be lowered again. For example, the adhesive 230 of the module housing 210 accommodated in the chamber having an air atmosphere of 180° C. to 220° C. may have a lowered viscosity by heating. However, if the adhesive 230 is heated at a temperature of 180° C. to 220° C. over a predetermined time, thermal curing such as polymerization may be caused by a thermal initiator. Thus, in the step (e), it is not desirable to heat the adhesive 230 over a predetermined time.

Further, the adhesive 230 of the step (e) 350 may have a lowered viscosity close to a liquid state rather than a solid state, so that at least a portion of the adhesive 230 may move through a gap between the module housing 210 and the cylindrical battery cell 100.

Also, the adhesive 230 may be compressed between the inner surface of the accommodation portion 215 of the module housing 210 and the outer surface of the cylindrical battery cell 100. In addition, the plurality of cylindrical battery cells 100 press the outer wall of the module housing 210 inwards in a state of being mounted to the module housing 210 so that the adhesive 230 in the liquid state connects the outer surface of the cylindrical battery cell 100 and the inner surface of the accommodation portion 215 of the module housing 210.

Further, in the step (f) 360, the adhesive 230 may be finally cured by irradiating ultraviolet rays (UV) to the adhesive 230 of the step (e) 350 where the viscosity of the adhesive 230 is lowered. At this time, the adhesive 230 may connect the cylindrical battery cell 100 and the inner surface of the accommodation portion 215 of the module housing 210. Also, the module housing 210 may at least partially include a material capable of transmitting ultraviolet rays.

In addition, the ultraviolet (UV) curing of the adhesive 230 may be performed using a common means. For example, a UV source having an irradiation power of 100 mW/cm$^2$ in a wavelength range of 200 nm to 400 nm may be used for the UV curing.

Further, in the step (0, after the module housing 210 is mounted inside a chamber provided with an ultraviolet ray generating device, ultraviolet rays (UV) may be irradiated to the adhesive 230 in a state where the chamber is sealed, to finally cure the adhesive 230. At this time, the inside of the chamber may have an air atmosphere containing oxygen at a concentration lower than the oxygen concentration (21%) in the ordinary air. At this time, the adhesive may include an additive that initiates or promotes curing under oxygen-deficient air conditions.

Thus, according to this configuration of the present disclosure, since the adhesive may be cured even in a low oxygen concentration environment, the curing may be performed inside the accommodation portion of the module housing 210 where heat transfer or the exposure to ultraviolet rays is not easy, thereby allowing the applied adhesive to be uniformly cured as a whole.

In addition, in the step (f), the adhesive 230 may be finally cured by performing thermal curing and ultraviolet curing together. For example, the chamber may further include an ultraviolet ray irradiation device. Further, in a state where the module housing 210 containing the plurality of cylindrical battery cells 100 is accommodated in the chamber including the ultraviolet ray irradiation device, the adhesive 230 is heated in an atmosphere of 180° C. to 220° C. for 30 minutes to 3 hours, and at least a portion of the adhesive 230 may be exposed to ultraviolet rays for 10 seconds to 30 seconds.

Here, if the adhesive 230 of the step (f) is heated in an atmosphere of 180° C. to 220° C. over a predetermined time, polymerization may be caused by the thermal initiator to increase the viscosity, thereby performing perfect crosslinking to come to a finally cured state.

Here, the "final curing" may have the same meaning as "complete curing". In addition, the "final curing" may mean that the adhesive is completely crosslinked, which is no longer undergoing crosslinking. That is, even though the adhesive 230 in the finally cured state is heated again at 180° C. to 220° C., its viscosity is not lowered again.

Thus, according to this configuration of the present disclosure, as the adhesive 230 is finally cured by heating and/or UV irradiation, the plurality of cylindrical battery cells 100 accommodated in the module housing 210 may be fixed without moving.

Accordingly, the battery module 200 manufactured by the manufacturing method of the present disclosure may maintain the cylindrical battery cells 100 to be stably fixed in the module housing 210 even in an environment where shaking or impact is applied frequently.

Thus, in the present disclosure, it is possible to prevent the cylindrical battery cells 100 from being damaged due to shaking or impact or prevent the electric connection between the cylindrical battery cells 100 and the bus bar from being cut off. That is, the durability of the battery module 200 may be effectively increased.

Figure 8:
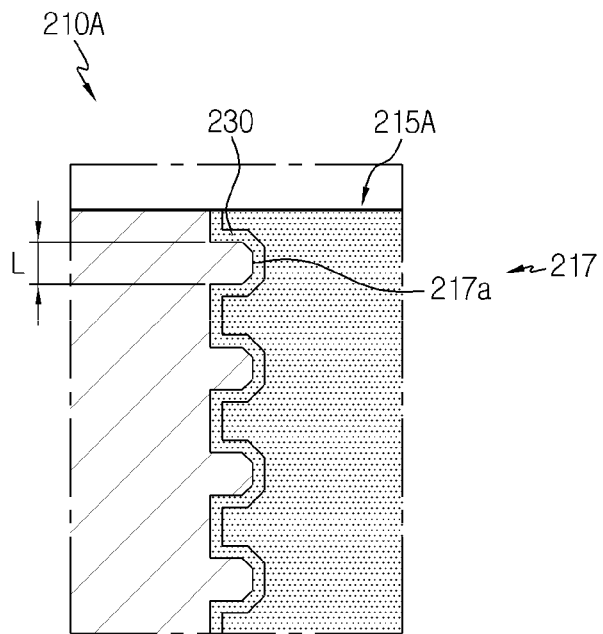
FIG. 8 is a partial cross-sectioned view schematically showing a region E' of the upper case, employed at the battery module of FIG. 6.

FIG. 8 is a partial cross-sectioned view schematically showing a region E' of the upper case, employed at the battery module of FIG. 6.

Referring to FIG. 8 along with FIG. 1, in the step (a) 310 of preparing the module housing 210, a fine uneven structure 217 having a convex portion 217a may be formed at the inner surface of the accommodation portion 215 of the module housing 210.

Specifically, a plurality of convex portions 217a protruding toward the cylindrical battery cells 100 may be formed at the inner surface of the accommodation portion 215A of the upper case 210A. Also, the convex portion 217a may have a columnar shape with a predetermined diameter L. For example, the diameter L may be 100 nm to 1 mm.

Further, the plurality of convex portions 217a may be spaced apart from each other at regular intervals. In addition, in the step (b) 320 of adding the adhesive 230, the adhesive 230 may be applied to cover the convex portions 217a of the fine uneven structure 217. Accordingly, the outer surface of the convex portions 217a of the fine uneven structure 217 formed at the inner surface of the accommodation portion 215 of the module housing 210 may be coated with the adhesive 230.

Similarly, a plurality of convex portions 217a protruding toward the cylindrical battery cells 100 may be formed at the inner surface of the accommodation portion 215B of the lower case 210B. Since the convex portion 217a of the lower case 210B has the same characteristics as the convex portion 217a of the upper case 210A, it will not be described in detail again.

Thus, according to this configuration of the present disclosure, since the fine uneven structure 217 having the plurality of convex portions 217a prevents the adhesive 230 applied to the inner surface of the accommodation portion 215 of the module housing 210 from easily flowing down, it is possible to prevent that the adhesive 230 is partially lost or the coating thickness of the added adhesive 230 becoming irregular.

Figure 9:
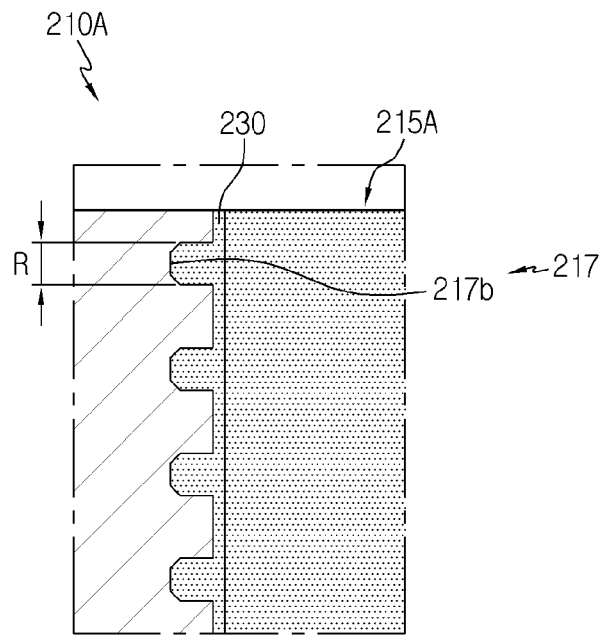
FIG. 9 is a perspective view schematically showing a portion of an upper case, employed at a battery module according to another embodiment of the present disclosure.

FIG. 9 is a perspective view schematically showing a portion of an upper case, employed at a battery module according to another embodiment of the present disclosure.

Referring to FIG. 9 along with FIG. 1, in the step (a) 310 of preparing the module housing 210, a fine uneven structure 217 having a concave portion 217b may be formed at the inner surface of the accommodation portion 215 of the module housing 210. Also, the concave portion 217b may be inwardly recessed opposite to the cylindrical battery cells 100. In addition, the concave portion 217b may have a recessed groove shape with a diameter R. In addition, in the step (b) 320 of adding the adhesive 230, the adhesive 230 may be applied so that the adhesive 230 is partially accommodated in the concave portion 217b of the fine uneven structure 217.

Further, if the adhesive 230 accommodated inside the concave portion 217b becomes close to a liquid state by heating, the adhesive 230 may be partially discharged out of the concave portion 217b to connect the outer surface of the cylindrical battery cell 100 and the inner surfaces of the accommodation portion 215 of the module housing 210.

Thus, according to this configuration of the present disclosure, since the fine uniform structure 217 having the plurality of the concave portions 217b prevents the adhesive 230 applied to the inner surface of the accommodation portion 215 of the module housing 210 from easily flowing down, it is possible to prevent that the adhesive 230 is partially lost or the coating thickness of the added adhesive 230 becoming irregular.

Referring to FIGS. 8 and 9 along with FIG. 1, the present disclosure provides the battery module 200 including the plurality of cylindrical battery cells 100 and the module housing 210 accommodating the plurality of cylindrical battery cells 100.

Here, electrode terminals may be formed at an upper portion and a lower portion of in the cylindrical battery cell 100, respectively. Also, the module housing 210 has the accommodating portion 215 with a plurality of hollow structures in which the plurality of cylindrical battery cells 100 are inserted and accommodated, and the adhesive 230 with a thermally curing property and an ultraviolet (UV) curing property may be added to the inner surface of the accommodating portion 215 to adhere and fix the cylindrical battery cells 100.

Here, the plurality of cylindrical battery cells 100 and the module housing 210 may be identical to the plurality of cylindrical battery cells 100 and the module housing 210 shown in FIGS. 1 to 5.

Figure 10:
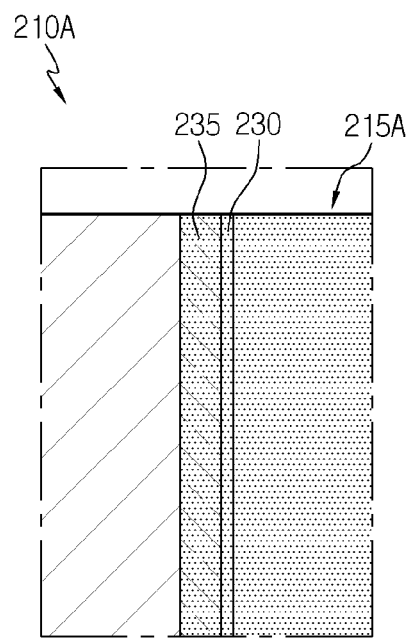
FIG. 10 is a perspective view schematically showing a portion of an upper case, employed at a battery module according to another embodiment of the present disclosure.

FIG. 10 is a perspective view schematically showing a portion of an upper case, employed at a battery module according to another embodiment of the present disclosure.

Referring to FIG. 10, the accommodation pad 215 of the module housing 210 may have an adsorption pad 235. Specifically, the adsorption pad 235 may be configured to adsorb and accommodate at least a portion of the adhesive 230 therein. For example, the adsorption pad 235 may be attached to and positioned at the inner surface of the accommodation portion 215 of the module housing 210. Also, the adsorption pad 235 may contain an electrically insulating material.

In addition, the adsorption pad 235 may be a porous material to accommodate a portion of the adhesive 230 therein. Also, the adsorption pad 235 may have an elastic material that is easily shrunken by an external pressure and then expanded again when the external pressure is removed.

For example, as shown in FIG. 10, the adsorption pad 235 may be attached to the inner surface of the accommodation portion 215A of the upper case 210A. Also, the adsorption pad 235 may accommodate a portion of the adhesive 230 therein.

Thus, according to this configuration of the present disclosure, the module housing 210 having the adsorption pad 235 may absorb the adhesive 230 and accommodate the adhesive 230 inside the accommodation portion 215 so that the adhesive 230 is not lost even in a flowable liquid state, thereby effectively reducing the phenomenon that the adhesive 230 flows down or is lost.

Moreover, if the adsorption pad 235 is made of an elastic material that may easily be expanded or shrunk, the adsorption pad 235 serve as a cushion while the cylindrical battery cells 100 are being accommodated in the accommodating portion 215 of the module housing 210, thereby preventing the cylindrical battery cells 100 from being damaged.

Further, since the cylindrical battery cells 100 are inserted into the accommodation portion 215 of the module housing 210 in a state where the adsorption pad 235 absorbs the adhesive 230, the adsorption pad 235 may discharge a portion of the absorbed adhesive 230 so that the adhesive 230 is uniformly distributed to the cylindrical battery cells 100 and the inner surface of the accommodation portion 215 of the module housing 210.

Meanwhile, a battery pack (not shown) according to the present disclosure may include at least one battery modules 200 of the present disclosure. Also, in addition to the battery module 200, the battery pack of the present disclosure may further include a pack case for accommodating the battery module 200, and various devices for controlling charge and discharge of the battery module 200, such as a battery management system (BMS), a current sensor, a fuse, and the like.

Also, the battery pack according to the present disclosure may be applied to a device such as an energy storage device. That is, the device according to the present disclosure may include the battery pack of the present disclosure.

For example, the battery pack may be applied to an energy storage system that may be used as an electrical power source in an emergency. That is, the energy storage system according to the present disclosure may include the battery pack of the present disclosure.

Meanwhile, even though the terms indicating directions such as upper, lower, left and right directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Reference Signs

| | |
|---|---|
| 200: battery module | |
| 100: cylindrical battery cell | 111, 112: electrode terminal |
| 210: module housing | 215: accommodation portion |

| Reference Signs | |
|---|---|
| 210A: upper case | 217: fine uneven structure |
| 210B: lower case | 217a, 217b: convex portion, concave portion |
| 230: adhesive | 235: adsorption pad |
| 240: first current collection plate | 250: second current collection plate |
| 245: first connection portion | 255: second connection portion |

What is claimed is:

1. A method for manufacturing a battery module, comprising:
preparing a plurality of cylindrical battery cells having electrode terminals respectively formed at an upper portion and a lower portion thereof, and a module housing in which an accommodation portion having a plurality of hollow structures is formed to accommodate the plurality of cylindrical battery cells therein;
adding an adhesive having a thermally curing property and an ultraviolet curing property to an inner surface of the accommodation portion of the module housing;
partially curing the added adhesive by applying heat thereto to increase a viscosity of the adhesive;
accommodating the plurality of cylindrical battery cells in the accommodation portion so that the partially-cured adhesive is interposed between the accommodation portion of the module housing and the cylindrical battery cells;
after the accommodating the cylindrical battery cells in the accommodation portion, applying heat to the adhesive to lower the viscosity of the adhesive; and
after the viscosity of the adhesive is lowered by applying the heat, curing the adhesive by irradiating ultraviolet rays to the adhesive.

2. The method for manufacturing a battery module according to claim 1,
wherein in the partially curing of the added adhesive, the adhesive is heated for 20 seconds to 40 seconds in a temperature condition of 140° C. to 170° C.

3. The method for manufacturing a battery module according to claim 1,
wherein in the applying heat to the adhesive, the adhesive is heated for 1 second to 60 seconds at 180° C. to 220° C.

4. The method for manufacturing a battery module according to claim 1,
wherein after the viscosity of the adhesive is lowered by applying the heat, the adhesive is finally cured by performing thermal curing and ultraviolet curing together.

5. The method for manufacturing a battery module according to claim 4,
wherein in the finally curing the adhesive, the adhesive is heated for 30 minutes to 3 hours at temperature of 180° C. to 220° C., and at least a portion of the adhesive is exposed to ultraviolet rays for 10 seconds to 30 seconds.

6. The method for manufacturing a battery module according to claim 1,
wherein in the preparing the plurality of cylindrical battery cells, the module housing is prepared so that a fine uneven structure having a convex portion protruding toward the cylindrical battery cells or a concave portion recessed opposite to the cylindrical battery cells is formed at the inner surface of the accommodation portion of the module housing.

7. The method for manufacturing a battery module according to claim 6,
wherein in the adding of the adhesive, the adhesive is applied to coat the convex portion of the fine uneven structure.

8. The method for manufacturing a battery module according to claim 6,
wherein in the adding of the adhesive, the adhesive is applied so that the adhesive is partially accommodated in the concave portion of the fine uneven structure.

9. A battery module, comprising:
a plurality of cylindrical battery cells having electrode terminals respectively formed at an upper portion and a lower portion thereof; and
a module housing having an accommodation portion with a plurality of hollow structures so that the plurality of cylindrical battery cells are inserted and accommodated therein,
wherein an adhesive having a thermally curing property and an ultraviolet curing property is added to an inner surface of the accommodation portion so that the cylindrical battery cells are adhered and fixed thereto.

10. The battery module according to claim 9,
wherein a fine uneven structure having a convex portion protruding toward the cylindrical battery cells or a concave portion recessed opposite to the cylindrical battery cells is formed at the inner surface of the accommodation portion of the module housing.

11. The battery module according to claim 10,
wherein the adhesive is applied to coat the convex portion of the fine uneven structure.

12. The battery module according to claim 10,
wherein the adhesive is applied so that the adhesive is partially accommodated in the concave portion of the fine uneven structure.

13. The battery module according to claim 9,
wherein an adsorption pad configured to adsorb at least a portion of the adhesive is provided at the accommodation portion of the module housing.

14. A battery pack, comprising at least one battery module defined in claim 9.

* * * * *